United States Patent
Gareiss et al.

(10) Patent No.: US 6,469,095 B1
(45) Date of Patent: Oct. 22, 2002

(54) FLAME-PROOFED MOLDING MATERIALS

(75) Inventors: Brigitte Gareiss, Obersülzen; Andreas Deckers, Flomborn; Martin Klatt, Mannheim; Wilhelm Weber, Neustadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/319,883

(22) PCT Filed: Dec. 4, 1997

(86) PCT No.: PCT/EP97/06777

§ 371 (c)(1), (2), (4) Date: Jun. 14, 1999

(87) PCT Pub. No.: WO98/27164

PCT Pub. Date: Jun. 25, 1998

(30) Foreign Application Priority Data

Dec. 19, 1996 (DE) ......................... 196 53 042

(51) Int. Cl.$^7$ .............................................. C08L 51/00
(52) U.S. Cl. .................. 524/504; 524/436; 524/504; 524/522; 525/78; 525/221; 525/329.7; 525/386; 525/387; 526/318; 526/318.25
(58) Field of Search .................. 525/78, 221, 329.7, 525/330, 386, 387; 524/436, 504, 522; 526/318.25, 318

(56) References Cited

U.S. PATENT DOCUMENTS

| | | | | |
|---|---|---|---|---|
| 3,520,861 A | * | 7/1970 | Thomson et al. | 526/318.25 |
| 3,966,672 A | * | 6/1976 | Gaylord | 524/436 |
| 4,071,494 A | * | 1/1978 | Gaylord | 524/436 |
| 4,081,424 A | * | 3/1978 | Gergens et al. | 525/390 |
| 4,172,859 A | | 10/1979 | Epstein | |
| 4,174,358 A | | 11/1979 | Epstein | |
| 4,248,990 A | * | 2/1981 | Pieski et al. | 526/317 |
| 4,252,924 A | * | 2/1981 | Chatterjee | 526/327 |
| 4,351,931 A | * | 9/1982 | Armitage et al. | 525/218 |
| 4,436,872 A | * | 3/1984 | Flood et al. | 525/183 |
| 4,506,056 A | * | 3/1985 | Gaylord | 524/445 |
| 4,511,684 A | * | 4/1985 | Schmid et al. | 524/432 |
| 4,722,959 A | * | 2/1988 | Inoue et al. | 524/437 |
| 4,845,146 A | * | 7/1989 | Inoue et al. | 524/436 |
| 4,851,463 A | * | 7/1989 | Opsahl et al. | 524/437 |
| 4,879,328 A | | 11/1989 | Karasawa | |
| 4,983,742 A | * | 1/1991 | Yusawa et al. | 524/436 |
| 5,017,637 A | * | 5/1991 | Smith et al. | 524/436 |
| 5,021,495 A | | 6/1991 | Minnick | |
| 5,286,793 A | * | 2/1994 | Cottis et al. | 525/390 |
| 5,317,051 A | * | 5/1994 | Harashigo et al. | 524/436 |
| 5,384,373 A | * | 1/1995 | McKinney et al. | 526/318.6 |
| 5,457,164 A | * | 10/1995 | Wilkie | 525/367 |
| 5,482,990 A | * | 1/1996 | Jow et al. | 524/436 |
| 5,496,878 A | | 3/1996 | Goetz et al. | |
| 5,623,019 A | * | 4/1997 | Wiggins et al. | 525/183 |
| 5,705,565 A | * | 1/1998 | Hughes et al. | 525/386 |
| 5,955,547 A | * | 9/1999 | Roberts et al. | 525/387 |

FOREIGN PATENT DOCUMENTS

| | | |
|---|---|---|
| DE | 26 22 973 | 12/1976 |
| DE | 37 22 156 | 1/1989 |
| DE | 42 16 042 | 11/1993 |
| EP | 174 343 | 3/1986 |
| EP | 328 273 | 8/1989 |
| EP | 629 665 | 12/1994 |
| FR | 1386563 | * 12/1964 |

OTHER PUBLICATIONS

*Fundamentals of High Polymers*—ed. O.A. Battista, 73 and 74, Reinhold Pub. Co., N.Y., 1958.*
Pat. Abst. of Japan, 08081598, Masaru.

* cited by examiner

*Primary Examiner*—Peter Szekely
(74) *Attorney, Agent, or Firm*—Keil & Weinkauf

(57) ABSTRACT

Thermoplastic molding compositions comprise

A) from 10 to 90% by weight of at least one thermoplastic polymer,

B) from 1 to 20% by weight of a polyethylene which contains carboxyl groups and has a mean molecular weight $M_n$ (number average) of from 24,000 to 100,000 g/mol, C) from 5 to 60% by weight of a halogen-free flame retardant D) from 0 to 70% by weight of other additives and processing aids, where the total of the percentages by weight of components A) to D) is 100%

16 Claims, No Drawings

FLAME-PROOFED MOLDING MATERIALS

The invention relates to thermoplastic molding compositions comprising
- A) from 10 to 90% by weight of at least one thermoplastic polymer,
- B) from 1 to 20% by weight of a polyethylene which contains carboxyl groups and has a mean molecular weight $M_n$ (number average) of from 24,000 to 100,000 g/mol,
- C) from 5 to 60% by weight of a halogen-free flame retardant
- D) from 0 to 70% by weight of other additives and processing aids, where the total of the percentages by weight of components A) to D) is 100%.

The invention also relates to the use of the novel molding compositions to produce fibers, films and shaped articles, and to the shaped articles of any type thus obtainable.

Ethylene copolymers carrying functional groups of various types are known as impact-modifiers for thermoplastics: for polyesters, from U.S. Pat. No. 4,879,328, DE-A-26 22 876 and EP-A 174 343, for example; for polyamides, from DE-A-26 22 973, for example.

DE-A 42 16 042 discloses low-molecular-weight polyethylene waxes which contain carboxyl groups and which improve the flame retardancy of unreinforced polyamides through specific preparation processes.

Such low-molecular-weight polyethylene additives, however, always continue to show dripping of flaming material, which for many applications is not acceptable.

Flame-retardant polyester molding compositions which, inter alia, contain ethylene copolymers are known from U.S. Pat. No. 5,021,495, where these molding compositions contain a halogen-containing flame retardant and an antimony synergist.

Halogen-containing flame-retardant thermoplastics are, besides other disadvantages, toxicologically questionable, and are increasingly being replaced by halogen-free flame-retardant thermoplastics.

Important requirements for such flame-retardant systems are in particular a light intrinsic color, adequate high-temperature stability during incorporation in the thermoplastics and retention of effectiveness when fibrous fillers are added (wicking effect of glass fibers, which adversely affects the flame-retardant properties).

Besides red phosphorus, there are mainly four other particular examples of halogen-free flame retardants.

1. Inorganic flame retardants based on hydroxides or carbonates, in particular those of magnesium, which must be employed in large amounts to have sufficient effect;
2. Nitrogen-containing flame retardants, such as melamine cyanurate, which mostly show adequate flame retardancy only in unreinforced thermoplastics;
3. Phosphorus compounds, such as triphenylphosphine oxide as flame retardant, which in many thermoplastics have an undesirable plasticizing side-effect;
4. Ammonium polyphosphates or melamine phosphate, which have inadequate thermal stability above 200° C.

It is an object of the present invention to provide a halogen-free flame-retardant combination for thermoplastics which shows adequate crust formation and charring in the presence of a flame, and prevents dripping of flaming material.

We have found that this object is achieved by means of the molding compositions defined at the outset. Preferred embodiments are seen in the subclaims.

Surprisingly, the addition of the ethylene copolymers according to the invention, in particular low-molecular-weight copolymers, in combination with halogen-free flame retardants, gives a synergistic flame-retardant effect. Thermoplastics containing glass fiber, in particular, show no dripping of flaming material when the combination according to the invention is used.

By means of the combination with ethylene copolymers, the amount of halogen-free flame retardant required to achieve the flammability materials classification V-O according to UL 94 can be drastically reduced, thus improving processibility and mechanical properties.

The novel molding compositions contain, as component A), from 10 to 90% by weight, preferably from 20 to 85% by weight, and in particular from 30 to 80% by weight, of a thermoplastic polymer.

In principle, the advantageous effect in the novel molding compositions is seen with thermoplastics of any type. A list of suitable thermoplastics is found, for example, in Kunststoff-Taschenbuch (ed. Saechtling), 1989 edition, which also gives reference sources. Processes for preparing such thermoplastics are known per se to the person skilled in the art. Some preferred plastics types are described in greater detail below.

1. Polycarbonates and Polyesters

Suitable polycarbonates (often also termed aromatic polyesters) are known per se. They are obtainable, for example, by interfacial polycondensation corresponding to the processes of DE-B-1 300 266 or by reaction of diphenyl carbonate with bisphenols, as in the process of DE-A-14 95 730. The preferred bisphenol is 2,2-di(4-hydroxyphenyl) propane, referred to generally, and also below, as bisphenol A.

In place of bisphenol A, other aromatic dihydroxy compounds can also be used, in particular 2,2-di(4-hydroxyphenyl)pentane, 2,6-dihydroxynapthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di(4-hydroxyphenyl)ethane or 4,4-dihydroxydiphenyl, and mixtures of these.

Particularly preferred polycarbonates are those based on bisphenol A or bisphenol A together with up to 30 mol % of the abovementioned aromatic dihydroxy compounds.

The relative viscosity of these polycarbonates is generally in the range from 1.1 to 1.5, in particular from 1.28 to 1.4 (measured at 25° C. in a 0.5% strength by weight solution in dichloromethane).

Suitable polyesters are likewise known per se and described in the literature. They contain, in their main chain, an aromatic ring which derives from an aromatic dicarboxylic acid. The aromatic ring may also be substituted, eg. with halogen, such as chlorine and bromine, or with $C_1$–$C_4$-alkyl, such as methyl, ethyl, isopropyl, n-propyl, n-butyl, isobutyl or tert-butyl.

The polyesters may be prepared by reaction of aromatic dicarboxylic acids, their esters or other ester-forming derivatives thereof with aliphatic dihydroxy compounds, in a manner known per se.

Preferred dicarboxylic acids are naphthalenedicarboxylic acid, terephthalic acid and isophthalic acid or mixtures of these. Up to 10 mol % of the aromatic dicarboxylic acids can be replaced by aliphatic or cycloaliphatic dicarboxylic acids, such as adipic acid, azelaic acid, sebacic acid, dodecanedioic acids and cyclohexanedicarboxylic acids.

Of the aliphatic dihydroxy compounds, preference is given to diols having from 2 to 6 carbon atoms, in particular 1,2-ethanediol, 1,4-butanediol, 1,6-hexanediol, 1,4- hexanediol, 1,4-cyclohexanediol and neopentyl glycol or mixtures of these.

Particularly preferred polyesters are polyalkylene terephthalates derived from alkanediols having from 2 to 6 carbon atoms. Of these, polyethylene terephthalate, polyethylene naphthalate and polybutylene terephthalate are particularly preferred.

The viscosity number of the polyesters is generally in the range from 60 to 200 ml/g (measured in a 0.5% strength by weight solution in a mixture of phenol and o-dichlorobenzene (weight ratio 1:1) at 25° C.).

2. Vinylaromatic Polymers

The molecular weight of these polymers, which are known per se and are commercially available, is generally in the range from 1500 to 2,000,000, preferably in the range from 70,000 to 1,000,000.

Vinylaromatic polymers which may be mentioned merely as examples here are those made from styrene, chlorostyrene, α-methylstyrene and p-methylstyrene; comonomers, such as (meth)acrylonitrile or (meth)acrylates, may also be involved in the construction in subordinate proportions (preferably not more than 20% by weight, in particular not more than 8% by weight). Particularly preferred vinylaromatic polymers are polystyrene and impact-modified polystyrene. Mixtures of these may, of course, also be employed. They are preferably prepared by the process described in EP-A-302 485.

Preferred ASA polymers are built up from a soft or rubbery phase of a graft polymer of:

$A_1$ from 50 to 90% by weight of a graft base, based on
  $A_{11}$ from 95 to 99.9% by weight of a $C_2$–$C_{10}$-alkyl acrylate and
  $A_{12}$ from 0.1 to 5% by weight of a bifunctional monomer having two non-conjugated olefinic double bonds, and
$A_2$ from 10 to 50% by weight of a graft of
  $A_{21}$ from 20 to 50% by weight of styrene or substituted styrenes of the formula I or mixtures of these, and
  $A_{22}$ from 10 to 80% by weight of acrylonitrile, methacrylonitrile, acrylates or methacrylates or mixtures of these,
mixed with a hard matrix based on a SAN copolymer $A_3$) of:
  $A_{31}$ from 50 to 90% by weight, preferably from 55 to 90% by weight, and in particular from 65 to 85% by weight, of styrene and/or substituted styrenes of the formula I and
  $A_{32}$ from 10 to 50% by weight, preferably from 10 to 45% by weight, and in particular from 15 to 35% by weight, of acrylonitrile and/or methacrylonitrile.

Component $A_1$) is an elastomer having a glass transition temperature of below —20° C., in particular below —30° C.

For preparing the elastomer, the main monomers $A_{11}$) employed are acrylates having from 2 to 10 carbon atoms, in particular from 4 to 8 carbon atoms. Examples of particularly preferred monomers are tert-butyl, isobutyl and n-butyl acrylates and 2-ethylhexyl acrylate, of which the two last named are particularly preferred.

Besides these acrylates, from 0.1 to 5% by weight, in particular from 1 to 4% by weight, based on the total weight $A_{11}+A_{12}$, of a polyfunctional monomer having at least two non-conjugated olefinic double bonds is employed. Of these compounds, preference is given to bifunctional compounds, i.e. having two non-conjugated double bonds. Examples are divinylbenzene, diallyl fumarate, diallyl phthalate, triallyl cyanurate, triallyl isocyanurate, tricyclodecenyl acrylate and dihydrodicyclopentadienyl acrylate, of which the two last named are particularly preferred.

Processes for preparing the graft base $A_1$ are known per se and are described, for example, in DE-B 1 260 135. Corresponding products are also commercially available.

Preparation by emulsion polymerization has proven particularly advantageous in some cases.

The precise conditions of polymerization, in particular the type, method of feeding, and amount of emulsifier are preferably selected so that the acrylate latex, which is at least partially crosslinked, has a mean particle size (weight average $d_{50}$) in the range from about 200 to 700 nm, in particular from 250 to 600 nm. The latex preferably has a narrow particle size distribution, i.e. the quotient is preferably smaller than 0.5, in particular smaller than 0.35.

The proportion of the graft base $A_1$ in the graft polymer $A_1+A_2$ is from 50 to 90% by weight, preferably from 55 to 85% by weight, and in particular from 60 to 80% by weight, based on the total weight of $A_1+A_2$.

A graft shell $A_2$ is grafted onto the graft base $A_1$, the graft shell $A_2$ being obtainable by copolymerization of
  $A_{21}$ from 20 to 90% by weight, preferably from 30 to 90% by weight, and in particular from 30 to 80% by weight, of styrene or substituted styrenes of the formula

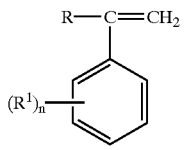

where R is alkyl having from 1 to 8 carbon atoms, hydrogen or halogen and $R^1$ is alkyl having from 1 to 8 carbon atoms or halogen and n is 0, 1, 2 or 3, and
  $A_{22}$ from 10 to 80% by weight, preferably from 10 to 70% by weight, and in particular from 20 to 70% by weight, of acrylonitrile, methacrylonitrile, acrylates or methacrylates or mixtures of these.

Examples of substituted styrenes are α-methylstyrene, p-methylstyrene, p-chlorostyrene and p-chloro-α-methylstyrene, and of these styrene and α-methylstyrene are preferred.

Preferred acrylates and/or methacrylates are those whose homopolymers and/or copolymers with the other monomers of component $A_{22}$) have glass transition temperatures above 20° C.; in principle, however, other acrylates may also be employed, preferably in amounts which result in an overall glass transition temperature $T_g$ of above 20° C. for the component $A_2$.

Particular preference is given to esters formed from acrylic or methacrylic acid with $C_1$–$C_8$ alcohols and esters containing epoxy groups, such as glycidyl acrylate and/or glycidyl methacrylate. Examples of very particularly preferred compounds are methyl methacrylate, tert-butyl methacrylate, glycidyl methacrylate and n-butyl acrylate, where the last named is preferably not employed in an excessively high proportion, because of its property of forming polymers with very low $T_g$.

The graft shell $A_2$) can be prepared in one or in a number of, eg. two or three, process steps, the overall formulation remaining unaffected.

The graft shell is preferably prepared in emulsion, as described, for example, in DE-C-12 60 135, DE-A-32 27 555, DE-A-31 49 357 and DE-A-34 14 118.

Depending on the selected conditions, the graft copolymerization gives rise to a certain proportion of free copolymers of styrene and/or substituted styrene derivatives and (meth)acrylonitrile and/or (meth)acrylates.

The graft copolymer $A_1+A_2$ generally has a mean particle size of from 100 to 1000 nm, in particular from 200 to 700 nm, ($d_{50}$ weight average). The conditions for preparing the elastomer $A_1$) and for the grafting are preferably therefore selected so as to give particle sizes in this range. Measures for this are known and are described, for example, in DE-C-1 260 135 and in DE-A-28 26 925, and in Journal of Applied Polymer Science, Vol. 9 (1965), pp. 2929 to 2938. The increase in particle size of the elastomer latex can be brought about, for example, by agglomeration.

For the purposes of this invention, the free, non-grafted homo- and copolymers arising during the graft copolymerization to prepare the component $A_2$) are counted as part of the graft polymer ($A_1+A_2$).

Some preferred graft polymers are listed below:

1:
   60% by weight of graft base $A_1$ made from
   $A_{11}$ 98% by weight of n-butyl acrylate and
   $A_{12}$ 2% by weight of dihydrodicyclopentadienyl acrylate and
   40% by weight of graft shell $A_2$ made from
   $A_{21}$ 75% by weight of styrene and
   $A_{22}$ 25% by weight of acrylonitrile 2:
   Graft base as in 1, with 5% by weight of a first graft shell of styrene and
   35% by weight of a second graft made from
   $A_{21}$ 75% by weight of styrene and
   $A_{22}$ 25% by weight of acrylonitrile 3:
   Graft base as in 1, with 13% by weight of a first graft of styrene and 27% by weight of a second graft made from styrene and acrylonitrile in a weight ratio of 3:1

The products present as component $A_3$) can be prepared, for example, by the process described in DE-B-10 01 001 and DE-B-10 03 436. Such copolymers are also available commercially. The weight average of the molecular weight, determined by light scattering, is preferably in the range from 50,000 to 500,000, in particular from 100,000 to 250,000.

The weight ratio of $(A_1+A_2):A_3$ is in the range from 1:2.5 to 2.5:1, preferably from 1:2 to 2:1 and in particular from 1:1.5 to 1.5:1.

SAN polymers suitable as component A) are described above (see $A_{31}$ and $A_{32}$).

The viscosity number of the SAN polymers measured according to DIN 53 727 as 0.5% strength by weight solution in dimethylformamide at 23° C. is generally in the range from 40 to 100 ml/g, preferably from 50 to 80 ml/g.

ABS polymers present as polymer (A) in the novel multiphase polymer mixtures have the same construction as described above for ASA polymers. In place of the acrylate rubber $A_1$) of the graft base of the ASA polymer, conjugated dienes are usually employed, preferably giving the following formulation for the graft base $A_4$:
   $A_{41}$ from 70 to 100% by weight of a conjugated diene and
   $A_{42}$ from 0 to 30% by weight of a bifunctional monomer having two non-conjugated olefinic double bonds In the formulation, the graft $A_2$ and the hard matrix of the SAN copolymer $A_3$) remain unchanged. Such products are commercially available, and the preparation processes are known to the person skilled in the art, so that further details here are unnecessary.

The weight ratio of $(A_4+A_2):A_3$ is in the range from 3:1 to 1:3, preferably from 2:1 to 1:2.

Particularly preferred formulations of the novel molding compositions contain, as component A), a mixture of:
   $A_1$) from 10 to 90% by weight of a polybutylene terephthalate
   $A_2$) from 0 to 40% by weight of a polyethylene terephthalate
   $A_3$) from 1 to 40% by weight of an ASA or ABS polymer or mixtures of these.

Products of this type are available from BASF AG under the trademark Ultradur® S (previously Ultrablend® S).

Other preferred formulations of component A) comprise
   $A_1$) from 10 to 90% by weight of a polycarbonate
   $A_2$) from 0 to 40% by weight of a polyester, preferably polybutylene terephthalate,
   $A_3$) from 1 to 40% by weight of an ASA or ABS polymer or mixtures of these.

Products of this type are obtainable under the BASF AG trademark Terblend®.

3. Polyamides

The polyamides of the novel molding compositions generally have a viscosity number of from 90 to 350 ml/g, preferably from 110 to 240 ml/g, determined in a 0.5% strength by weight solution in 96% strength by weight sulfuric acid at 25° C., according to ISO 307.

Preference is given to semicrystalline or amorphous resins with a molecular weight (weight average) of at least 5000, as described, for example, in U.S. Pat. Nos. 2,071,250, 2,071,251, 2,130,523, 2,130,948, 2,241,322, 2,312,966, 2,512,606 and 3,393,210.

Examples of these are polyamides derived from lactams having from 7 to 13 ring members, such as polycaprolactam, polycapryllactam and polylaurinlactam, and polyamides obtained by reacting dicarboxylic acids with diamines.

Dicarboxylic acids which may be employed are alkanedicarboxylic acids having from 6 to 12, in particular from 6 to 10, carbon atoms and aromatic dicarboxylic acids. Merely as examples, mention may be made of adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and m-xylylenediamine, di(4-aminophenyl)methane, di(4-aminocyclohexyl)methane, 2,2-di(4-aminophenyl)propane or 2,2-di(4-aminocyclohexyl)propane.

Preferred polyamides are polyhexamethylene adipamide, polyhexamethylene sebacamide, polycaprolactam and copolyamide 6/66, especially with a proportion of from 5 to 95% by weight of caprolactam units.

Examples of other polyamides are those obtainable, for example, by condensing 1,4-diaminobutane with adipic acid at elevated temperature (nylon-4,6). Preparation processes for polyamides of this structure are described, for example, in EP-A 38 094, EP-A 38 582 and EP-A 39 524.

Polyamides which are obtainable by copolymerizing two or more of the abovementioned monomers, and mixtures of a number of polyamides in any desired mixing ratio, are also suitable.

Partly aromatic copolyamides, such as nylon-6/6T and nylon-6,6/6T, having a triamine content which is less than 0.5% by weight, preferably less than 0.3% by weight, have, moreover, proven especially advantageous (see EP-A 299 444).

The preferred partly aromatic copolyamides having low triamine content can be prepared by the processes described in EP-A 129 195 and 129 196.

4. Polyphenylene Ethers

Suitable polyphenylene ethers generally have a molecular weight (weight average) in the range from 10,000 to 80,000, preferably from 20,000 to 60,000, and in particular from 40,000 to 55,000.

The molecular weight distribution is generally determined by gel permeation chromatography (GPC), for which PPE specimens are dissolved in THF under superatmospheric pressure at 110° C. and 0.16 ml of a 0.25% strength solution is injected onto suitable separating columns at room temperature, using THF as eluent. Detection is generally by UV detector. The separating columns are expediently calibrated using PPE specimens of known molecular weight distribution.

This corresponds to a reduced specific viscosity $\eta_{red}$ of from 0.2 to 0.9 dl/g, preferably from 0.35 to 0.8 dl/g and in particular from 0.45 to 0.6 dl/g, measured in a 0.5% strength by weight solution in chloroform at 25° C.

The unmodified polyphenylene ethers $a_1$) are known per se and are preferably prepared by oxidative coupling of o-disubstituted phenols.

Examples of substituents are halogen, such as chlorine or bromine, and alkyl radicals with from 1 to 4 carbon atoms, preferably without a tertiary hydrogen atom at the α-position, such as methyl, ethyl, propyl or butyl. The alkyl radicals may themselves be substituted by halogen, such as chlorine or bromine, or by hydroxyl. Other examples of possible substituents are alkoxy radicals, preferably with up to 4 carbon atoms, and phenyl radicals, which may be unsubstituted or substituted by halogen and/or alkyl. Copolymers of various phenols, such as copolymers of 2,6-dimethylphenol and 2,3,6-trimethylphenol, are likewise suitable. Mixtures of various polyphenylene ethers may, of course, also be employed.

The polyphenylene ethers used as component $a_1$) may, if desired, include process-derived defects, for example as described in White et al., Macromolecules 23, 1318–1329 (1990).

Preference is given to polyphenylene ethers which are compatible with vinylaromatic polymers, ie. are completely or very largely soluble in these polymers (cf. A. Noshay, Block Copolymers, pp. 8–10, Academic Press, 1977 and O. Olabisi, Polymer-Polymer Miscibility, 1979, pp. 117–189).

Examples of polyphenylene ethers are poly(2,6-dilauryl-1,4-phenylene)ether, poly(2,6-diphenyl-1,4-phenylene) ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether and poly(2,5-dibromo-1,4-phenylene)ether. Preference is given to polyphenylene ethers in which the substituents are alkyl radicals with from 1 to 4 carbon atoms, such as poly(2,6-dimethyl-1,4-phenylene)ether, poly(2,6-diethyl-1,4-phenylene)ether, poly(2-methyl-6-ethyl-1,4-phenylene) ether, poly(2-methyl-6-propyl-1,4-phenylene)ether, poly(2,6-dipropyl-1,4-phenylene)ether and poly(2-ethyl-6-propyl-1,4-phenylene)ether.

Graft copolymers of polyphenylene ether and vinylaromatic polymers, such as styrene, α-methylstyrene, vinyltoluene and chlorostyrene, are also suitable.

Functionalized or modified polyphenylene ethers are known per se, for example from WO-A 86/02086, WO-A 87/00540, EP-A-222 246, EP-A-223 116 and EP-A-254 048, and are preferably employed for mixtures with polyamide or polyester.

An unmodified polyphenylene ether $a_1$) is usually modified by incorporating at least one carbonyl, carboxy, anhydride, amide, imide, carboxylic ester, carboxylate, amino, hydroxyl, epoxy, oxazoline, urethane, urea, lactam or halobenzyl group, so as to ensure adequate compatibility, for example with the polyamide.

The modification is generally carried out by reacting an unmodified polyphenylene ether $a_1$) with a modifier containing at least one of the abovementioned groups and at least one C—C double or triple bond, in solution (WO-A 86/2086), in aqueous dispersion, in a gas-phase process (EP-A-25 200) or in the melt, if appropriate in the presence of suitable vinylaromatic polymers or impact modifiers, if desired in the presence of free-radical initiators.

Suitable modifiers ($a_3$) are, for example, maleic acid, methylmaleic acid, itaconic acid and tetrahydrophthalic acid, and the anhydrides and imides of these, fumaric acid, and the mono- and diesters of these acids, eg. of $C_1$-and $C_2$–$C_8$-alkanols ($a_{31}$), the mono- or diamides of these acids, such as N-phenylmaleimide (monomer $a_{32}$), and maleohydrazide. Other examples are N-vinylpyrrolidone and (meth) acryloylcaprolactam ($a_{33}$).

Component A) in the novel molding compositions is preferably a modified polyphenylene ether obtainable by reaction of $a_1$) from 70 to 99.95% by weight, preferably from 76.5 to 99.94% by weight of an unmodified polyphenylene ether, $a_2$) from 0 to 25% by weight, preferably from 0 to 20% by weight of a vinylaromatic polymer, $a_3$) from 0.05 to 5% by weight, preferably from 0.05 to 2.5% by weight of at least one compound from the group consisting of $a_{31}$) an α, β-unsaturated dicarbonyl compound, $a_{32}$) a monomer containing amide groups and a polymerizable double bond and $a_{33}$) a monomer containing lactam groups and a polymerizable double bond, $a_4$) from 0 to 5% by weight, preferably from 0.01 to 0.09% by weight, of a free-radical initiator, where the percentages by weight are based on the total of $a_1$) to $a_4$) inclusive, for from 0.5 to 15 minutes at from 240 to 375° C. in suitable mixing and compounding apparatus, such as twin-screw extruders.

The vinylaromatic polymer $a_2$) should preferably be compatible, as described above under 2., with the polyphenylene ether employed.

Examples of preferred vinylaromatic polymers compatible with polyphenylene ethers can be found in the abovementioned monograph by Olabisi, pp. 224–230 and 245.

Examples of free-radical initiators $a_4$) are: 2,4-dichlorobenzoyl peroxide, tert-butyl peroxide, 3,5,5-trimethylhexanoyl peroxide, lauroyl peroxide, decanoyl peroxide, propionyl peroxide, benzoyl peroxide, tert-butyl 2-ethylperoxyhexoate, tert-butyl peroxydiethylacetate, tert-butyl peroxyisobutyrate, 1,1-di-tert-butylperoxy-3,3,5-trimethylcyclohexane, tert-butylperoxy isopropyl carbonate, tert-butylperoxy-3,3,5-trimethylhexoate, tert-butyl peracetate, tert-butyl perbenzoate, butyl 4,4-di-tert-butylperoxy valerate, 2,2-di-tert-butylperoxybutane, cumyl peroxide, tert-butylcumyl peroxide, 1,3-di(tert-butylperoxyisopropyl)benzene and tert-butyl peroxide. Mention may also be made of organic hydroperoxides, such as diisopropylbenzene hydroperoxide, cumene hydroperoxide, tert-butyl hydroperoxide, p-menthyl hydroperoxide and pinane hydroperoxide and highly-branched alkanes of the structure

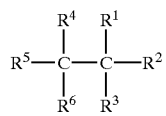

where $R^1$ to $R^6$ are alkyl with from 1 to 8 carbon atoms, alkoxy with from 1 to 8 carbon atoms, aryl, such as phenyl, naphthyl or 5- or 6-membered heterocyclic rings with a π-electron system and nitrogen, oxygen or sulfur as heteroatoms. The substituents $R^1$ to $R^6$ may themselves be substituted by functional groups, such as carboxyl, carboxyl derivatives, hydroxyl, amino, thiol or epoxide. Examples are 2,3-dimethyl-2,3-diphenylbutane, 3,4-dimethyl-3,4-diphenylhexane and 2,2,3,3-tetraphenylbutane.

Particularly preferred polyphenylene ethers A) in the novel molding compositions are those obtained by modification using maleic acid, maleic anhydride or fumaric acid. Polyphenylene ethers of this type preferably have an acid number of from 1.8 to 3.2, in particular from 2.0 to 3.0.

The acid number is a measure of the degree of modification of the polyphenylene ether and is generally determined by titration with bases under inert gas.

The acid number generally corresponds to the amount of base in mg which is required (according to DIN 53 402) for neutralization of 1 g of a polyphenylene ether B) which has been acid-modified as described.

The hovel molding compositions contain, as component B), from 1 to 20% by weight, preferably from 1 to 15% by weight, in particular from 1 to 10% by weight, of a polyethylene which contains carboxyl groups and has a mean molecular weight $M_n$ (number average) of from 24,000 to 100,000 g/mol, preferably from 25,000 to 80,000 g/mol, and in particular from 50,000 to 70,000 g/mol.

The molecular weight is usually determined by GPC (gel permeation chromatography) with HDPE standard.

The melt flow index (MFI) is preferably from 1 to 100 g/10 min, particularly preferably from 5 to 50 g/10 min, in particular from 5 to 20 g/10 min, and very particularly from 10 to 15 g/10 min (at 160° C./0.325 kg) according to DIN 53 735.

The polyethylenes which contain carboxyl groups may be copolymers of ethylene with α, β-unsaturated carboxylic acids or polyethylenes onto which carboxylic acids are grafted.

Such polyethylenes can be prepared by the high-pressure process (see Ullmanns Enzyklopädie der technischen Chemie, 4th Edition, Vol. 15, p. 428).

Preferred formulations of component B) are built up from from 10 to 50% by weight, preferably from 15 to 35% by weight, of compounds containing carboxyl groups with from 50 to 90% by weight, preferably from 65 to 85% by weight, of ethylene.

Preferred components B), which may be employed alone or in mixtures, are copolymers of ethylene and an α, β-unsaturated carboxylic acid of the formula I

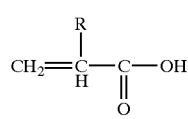

where R is hydrogen or alkyl having from 1 to 5 carbon atoms, hydrogen and methyl being preferred.

Processes for preparing the ethylene-acrylic acid copolymers are known per se.

The polymerization can be carried out either in an agitated autoclave or in a tubular reactor through which there is continuous flow.

For the polymerization, a compressed gaseous mixture of the monomers is usually fed to the reactor. Suitable free-radical generators which initiate the free-radical polymerization are at the same time metered into the inlet(s). Such initiators can be either organic peroxides or air and/or oxygen.

The comonomer content and molecular weight are generally adjusted by tuning the reaction conditions (initiator, pressure, gas inlet temperatures and molecular weight regulator). The reaction temperature is generally from about 180 to 330° C.; the pressure is generally from 500 to 4000 bar. The reactor type preferably used is the agitated autoclave, which ensures that the reaction is conducted smoothly.

The novel molding compositions contain, as component C), from 5 to 60% by weight, preferably from 10 to 50% by weight, and in particular from 15 to 45% by weight, of a halogen-free flame retardant.

The commercially available magnesium hydroxide products are lamellar solids generally having a specific surface area, determined by the BET method according to DIN 66 131, in the range from 5 to 100 m$^2$/g, preferably from 5 to 20 m$^2$/g, and in particular from 8 to 12 m$^2$/g. The mean particle size is generally from 0.4 to 20 μm, preferably from 0.5 to 2 μm, and in particular from 0.8 to 1.5 μm.

Preparation processes are known to the person skilled in the art, so that further details are not necessary.

Preferred flame retardants in the novel molding compositions are magnesium hydroxides which have been surface-pretreated with a silane compound.

By means of the silanization, the desired V-0 classification according to UL 94 can be achieved with a smaller amount of Mg(OH)$_2$. In addition, better mechanical properties (in particular impact resistance) of the shaped articles are achievable.

Suitable silane compounds have the formula III

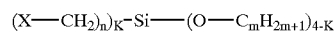

where:

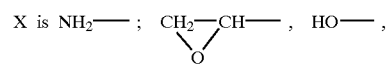

n is an integer from 2 to 10, preferably from 3 to 4 m is an integer from 1 to 5, preferably from 1 to 2 k is an integer from 1 to 3, preferably 1

Preferred silane compounds are aminopropyltrimethoxysilane, aminobutyltrimethoxysilane, aminopropyltriethoxysilane, aminobutyltriethoxysilane, and the corresponding silanes which contain glycidyl as substituent X.

The silane compounds are generally employed for surface coating in amounts (based on C) of from 0.05 to 5% by weight, preferably from 0.5 to 1.5% by weight, and in particular from 0.8 to 1% by weight.

A preferred flame retardant (C), in particular in combination with glass-fiber-reinforced molding compositions, is elemental red phosphorus, which can be employed in untreated form.

However, particularly suitable preparations are those in which the phosphorus is surface-coated with low-molecularweight liquids, such as silicone oil, paraffin oil or phthalates or adipates, or with polymeric or oligomeric compounds, eg. with phenolic resins or aminoplasts and polyurethanes.

Concentrates of red phosphorus, eg. in a polyamide or elastomers, are also suitable as flame retardants. Polyolefin homo- and copolymers are especially suitable as concentrate polymers, but the proportion of the concentrate polymer in the novel molding composition should not be more than 35% by weight, based on the weight of components (A) and (B).

The mean particle size ($d_{50}$) of the phosphorus particles distributed in the molding compositions is preferably in the range from 0.0001 to 0.5 mm; in particular from 0.001 to 0.2 mm.

Component C) is an organic or inorganic phosphorus-containing compound in which the phosphorus has a valence state from −3 to +5. The term valence state is taken to mean oxidation state, as given in "Lehrbuch der Anorganischen Chemie" by A. F. Hollemann and E. Wiberg, Walter des Gruyter and Co. (1964, 57th to 70th Edition), pp. 166–177. Phosphorus compounds of valence states from −3 to +5 are derived from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

From the large number of phosphorus-containing compounds, only a few examples are mentioned.

Examples of phosphorus compounds of the phosphine class, having the valence state −3, are aromatic phosphines, such as inter alia triphenyl phosphine, tritolyl phosphine, trinonyl phosphine, and trinaphthyl phosphine. Triphenyl phosphine is particularly suitable.

Examples of phosphorus compounds of the diphosphine class, having the valence state −2, are inter alia tetraphenyldiphosphine and tetranaphthyldiphosphine. Tetranaphthyldiphosphine is particularly suitable.

Phosphorus compounds of the valence state −1 are derived from phosphine oxide. Examples are triphenylphosphine oxide, tritolylphosphine oxide, trinonylphosphine oxide, and trinaphthylphosphine oxide. Triphenylphosphine oxide is preferred.

Phosphorus of the valence state ±0 is elemental phosphorus, as previously mentioned.

Examples of phosphorus compounds of the oxidation state +1 are hypophosphites. They may have the character of salts or be purely organic. Examples are calcium hypophosphite and magnesium hypophosphite, in addition double and complex hypophosphites, organic hypophosphites, such as cellulose hypophosphite esters, diol esters of hypophosphorous acids, for example those of 1,10-dodecyldiol. Substituted phosphinic acids and their anhydrides, for example diphenylphosphinic acid, may also be employed. Melamine hypophosphite is also suitable. Further examples are diphenylphosphinic acid, di-p-tolylphosphinic acid and di-cresylphosphinic anhydride, and also inter alia compounds such as bis(diphenylphosphinic acid) esters of hydroquinone, ethylene glycol and propylene glycol. Other suitable compounds are aryl(alkyl)phosphinic amides, such as diphenylphosphinic dimethylamide and sulfonamidoaryl (alkyl)phosphinic acid derivatives, such as p-tolylsulfonamidodiphenylphosphinic acid. Preference is given to using the bis(diphenylphosphinic acid) esters of hydroquinone and ethylene glycol and hydroquinone bis-diphenylphosphinate.

Phosphorus compounds of the oxidation state +3 are derived from phosphorous acid. Suitable compounds are cyclic phosphonates derived from pentaerythritol, neopentyl glycol or pyrocatechol. Phosphorus of the valence state +3 is also present in triaryl(alkyl)phosphites, such as triphenyl phosphite, tris(4-decylphenyl)phosphite, tris(2,4-di-tert-butylphenyl)phosphite or phenyl didecyl phosphite inter alia. Further examples are, however, diphosphites, such as propylene glycol 1,2-bis-(diphosphite) and cyclic phosphites derived from pentaerythritol, neopentyl glycol or pyrocatechol.

Particular preference is given to methyl neopentyl glycol phosphonate (methanephosphonic acid methyl ester) and phosphite, and dimethyl pentaerythritol diphosphonate and phosphite.

Examples of phosphorus compounds of the oxidation state +4 are primarily hypodiphosphates, for example tetraphenyl hypodiphosphate and bisneopentyl hypodiphosphate.

Examples of phosphorus compounds of the oxidation state +5 are primarily alkyl- and aryl-substituted phosphates, such as phenyl bisdodecyl phosphate, phenyl ethyl hydrogen phosphate, phenyl bis(3,5,5-trimethylhexyl)phosphate, ethyl diphenyl phosphate, 2-ethylhexyl ditolyl phosphate, diphenyl hydrogen phosphate, bis(2-ethylhexyl)-p-tolyl phosphate, tritolyl phosphate, bis(2-ethylhexyl)phenyl phosphate, dinonyl phenyl phosphate, phenyl methyl hydrogen phosphate, di(dodecyl)-p-tolyl phosphate, p-tolyl bis(2,5,5-trimethylhexyl)phosphate and 2-ethylhexyl diphenyl phosphate. Phosphorus compounds in which every radical is aryloxy are particularly suitable. Triphenyl phosphate is very particularly suitable.

Cyclic phosphates may additionally also be employed, diphenyl pentaerythritol diphosphate and phenyl neopentyl glycol phosphate being particularly suitable.

Besides the abovementioned low-molecular-weight phosphorus compounds, oligomeric and polymeric phosphorus compounds are also suitable.

Halogen-free polymeric organic phosphorus compounds of this type, having phosphorus in the polymer chain, are formed, for example, in the preparation of pentacyclic unsaturated phosphine dihalides, as described, for example, in DE-A-20 36 173. The molecular weight of the polyphospholine oxides measured by vapor-pressure osmometry in dimethylformamide is claimed to be in the range from 500 to 7000, preferably from 700 to 2000.

Here phosphorus has the oxidation state −1.

Inorganic coordination polymers of aryl(alkyl)phosphinic acids, such as poly-β-sodium(I) methylphenylphosphinate, may also be employed. Their preparation is given in DE-A-31 40 520. Phosphorus has the oxidation number +1.

Halogen-free polymeric phosphorus compounds of this type can furthermore result from the reaction of a phosphonic acid chloride, such as phenyl-, methyl-, propyl-, styryl- or vinylphosphonic acid dichloride, with dihydric phenols, such as hydroquinone, resorcinol, 2,3,5-trimethylhydroquinone, bisphenol A, or tetramethylbisphenol A.

Other halogen-free polymeric phosphorus compounds which may be present in the novel molding compositions are prepared by reacting phosphoryl chloride or phosphoric ester dichlorides with a mixture of mono-, di- and trihydric phenols and other hydroxyl-containing compounds (cf. Houben-Weyl-Müller, Thieme-Verlag Stuttgart, Organische Phosphorverbindungen Part II (1963)). Furthermore, polymeric phosphonates can be prepared by transesterification of phosphonates with dihydric phenols (cf. DE-A-29 25 208) or by reaction of phosphonates with diamines, diamides or hydrazides (cf. U.S. Pat. No. 4 403 075). The inorganic compound poly(ammonium phosphate) is, however, also suitable.

Use may also be made of oligomeric pentaerythritol phosphites, phosphates and phosphonates according to EP-B 8 486, for example Mobil Antiblaze® 19 (registered trademark of Mobil Oil).

Very particular preference is given to the employment of triphenylphosphine oxide, triphenyl phosphate, hydroquinone bis(diphenylphosphinate) and methyl neopentyl phosphate (methanephosphonic acid neopentyl ester) and Mobil Antiblaze 19 and resorcinol diphosphate, where these compounds may be added either alone or in any desired mixing ratio.

Other preferred flame retardants are melamine (formula I) and melamine cyanurate, the last named being a reaction product of preferably equimolar amounts of melamine and cyanuric acid and/or isocyanuric acid (formulae IIa and IIb).

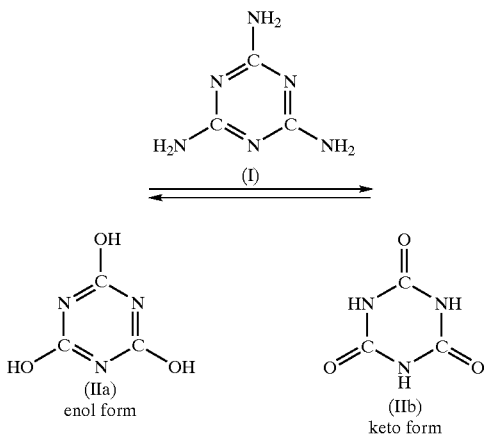

It is obtained, for example, by reacting aqueous solutions of the starting compounds at from 90 to 100° C. The commercially available product is a white powder with a mean particle size $d_{50}$ of from 1.5 to 2.5 μm.

Melamine oxalate, melamine phosphate, melamine borate or melamine stearate are also suitable as component C).

Mixtures of the abovementioned triazine derivatives, in any desired ratio, may also be employed.

Other suitable flame retardants are mixtures of carbonates of metals in the second main group of the Periodic Table.

Mixtures of the following have proven especially suitable $c_1$) a magnesium calcium carbonate of the formula $$Mg_xCa_y(CO_3)_{x+y} \cdot m \; H_2O,$$

where
  x and y are numbers from 1 to 5
  and $x/y \geq 1$
  and $m \geq 0$ and $c_2$) a basic magnesium carbonate of the formula $$Mg_n(CO_3)_v(OH)_{2n-2v} \cdot w \; H_2O,$$

where n is a number from 1 to 6,
  v is a number greater than 0 and smaller than 6
  and n/v>1
  and $w \geq 0$ where the $c_1$:$c_2$ mixing ratio is in the range from 1:1 to 3:1.

The magnesium calcium carbonates $c_1$) may be hydrated or anhydrous. Preference is given to the naturally occurring minerals, such as dolomite and huntite.

An anhydrous form in which x=3 and y=1, $Mg_3Ca(CO_3)_4$ (huntite), is particularly preferred.

The basic magnesium carbonates $c_2$) may likewise be employed in either hydrated or anhydrous form, and here too the naturally occurring minerals, such as hydromagnesite, a hydrated compound with n=5, v=4 and w=4, $Mg_5(CO_3)_4(OH)_2 \cdot 4H_2O$, are preferred.

The $c_1$:$c_2$) ratio is particularly preferably in the range from 1:1 to 2:1.

The mixing ratio of the two components B) and C) is variable within wide limits. Preference is given to ratios, based on the total weight of components B) and C), of from 10 to 70% by weight of component B) with from 30 to 90% by weight of component C).

The novel molding compositions may contain, as component D), up to 70% by weight, in particular not more than 50% by weight, of conventional additives and processing aids.

The novel molding compositions may contain, as component D), from 1 to 50% by weight, preferably from 5 to 40% by weight, and in particular from 10 to 30% by weight, of a filler.

Examples of preferred fibrous fillers are carbon fibers, aramid fibers and potassium titanate fibers, fibers of E glass being preferred. These may be employed as rovings or as chopped glass in the commercially available forms.

The fibrous fillers may be surface-pretreated with a silane compound for better compatibility with the thermoplastics.

Needle-shaped mineral fillers are also suitable.

For the purposes of the invention, the term needle-shaped mineral fillers is taken to mean a mineral filler with pronounced needle-shaped character, for example needle-shaped wollastonite. The mineral preferably has an L/D (length/diameter) ratio of from 8:1 to 35:1, preferably from 8:1 to 11:1. The mineral filler may, if desired, have been pretreated with the abovementioned silane compounds, but the pretreatment is not essential.

Other fillers are, for example, kaolin, calcined kaolin, wollastonite, talc and chalk.

Other additives and processing aids are, for example, from 0 to 2% by weight of fluorine-containing ethylenic polymers. These ethylenic polymers have a fluorine content of from 55 to 76% by weight, preferably from 70 to 76% by weight.

Examples of these are polytetrafluoroethylene (PTFE), tetrafluoroethylene copolymers and tetrafluoroethylene copolymers having relatively small proportions (generally up to 50% by weight) of copolymerizable ethylenically unsaturated monomers. These are described, for example, by Schildknecht in "Vinyl and Related Polymers", Wiley, 1952, pages 484–494, and by Wall in "Fluoropolymers" (Wiley Interscience, 1972).

These fluorine-containing ethylenic polymers are homogeneously distributed in the molding compositions and preferably have a particle size $d_{50}$ (number average) in the range from 0.05 to 10 μm, in particular from 0.1 to 5 μm. These small particle sizes can particularly preferably be achieved by using aqueous dispersions of fluorine-containing ethylenic polymers and incorporating them into, for example, a polyester melt.

The additives may be, for example, impact modifiers (also referred to as elastomeric polymers or elastomers), which may be present in amounts of up to 20% by weight, preferably up to 15% by weight.

Suitable impact modifiers are the conventional rubbers, eg. ethylene copolymers having reactive groups, acrylate rubber and polymers of conjugated dienes, such as polybutadiene rubber and polyisoprene rubber. The diene polymers may be partially or completely hydrogenated, in a manner known per se. Other impact modifiers are, for example, hydrogenated styrene-butadiene rubber, ethylene-propylene-diene rubber, polybutylene and polyoctenamer rubbers, ionomers, block copolymers of vinylaromatic monomers with dienes, such as butadiene or isoprene (known per se from EP-A 62 282) with the $M^1M^2$-, $M^1M^2M^1M^2$- or $M^1M^2M^1$-structure, where these block polymers may also contain segments with random distribution, and star block copolymers. Polymers of conjugated dienes, such as polybutadiene rubber and polyisoprene rubber, have proven especially suitable. Synthetic rubbers of this type are familiar to the person skilled in the art and are reviewed in "Ullmanns Encyklopädie der Technischen Chemie", 4th Edition, Vol. 13, pp. 595–634, Verlag Chemie GmbH, Weinheim 1977.

Examples of additives are thermal and light stabilizers, lubricants, mold-release agents and colorants, such as dyes and pigments, in the conventional amounts.

Furthermore, mention may be made of esters or amides derived from at least one alcohol or amine with at least three functional groups and one or a number of mono- or dicarboxylic acids having from 5 to 34 carbon atoms, pentaerythritol tetrastearate being preferred, and/or salts of Mg, Ca, Zn with carboxylic acids having up to 34 carbon atoms, in particular calcium stearate.

The desired properties of the end products can to a large extent be controlled by varying the type and amount of these additives.

The novel molding compositions can be prepared by processes known per se. In a preferred embodiment, the preparation is carried out by addition of the components B) and C) to the melt of component A).

For this, it is expedient to use extruders, for example single-screw or twin-screw extruders, or other conventional plastication apparatus, such as Brabender mixers or Banbury mixers.

If a thermoplastic polycondensate is present, the plastic mixtures may then be subjected to a further thermal treatment, ie. a postcondensation in the solid phase. The molding composition, in the form appropriate to the process, is conditioned in a conditioning apparatus, for example a tumbling mixer or a continuous or batch conditioning tube, until the desired viscosity number VN or relative viscosity $\eta_{rel}$ of, for example, the polyamide has been reached. The temperature range for the conditioning depends on the melting point of the pure component A). Preferred temperature ranges are from 5 to 50° C., preferably from 20 to 30° C., below the respective melting point of A). The process is preferably carried out in an inert gas atmosphere, preferred inert gases being nitrogen and superheated steam.

The residence times are generally from 0.5 to 50, preferably from 4 to 20, hours. Conventional apparatus are then employed to produce shaped articles from the molding compositions.

The novel molding compositions are distinguished by good processability and by good flame retardancy, in particular by the absence of dripping of flaming material. Furthermore, the mechanical properties are to a very large extent retained even in the presence of a phosphorus compound. The compositions are therefore suitable for the production of fibers, films and shaped articles of any type, in particular for use in the electrical and electronic sectors, eg. lamp components, such as lamp sockets and lamp holders, plugs and multipoint connectors, coil formers, casings for capacitors or connectors, and circuit-breakers, relay housings and reflectors, and covers, computer cases and switch components.

EXAMPLES

The following components were employed:
Component A)
   A/1 nylon-6 with a VN of 151 ml/g, measured in 96% strength $H_2SO_4$ as 0.5% strength by weight solution (Ultramid® B3 from BASF AG).
   A/2 polybutylene terephthalate with a VN of 130 ml/g, measured in phenol/dichlorobenzene (1:1) (Ultradur® B 4500 from BASF AG).
Component B)
   Specification for preparing the ethylene acrylic acid copolymers Ethylene and acrylic acid are copolymerized in a continuously operating agitated autoclave having 1 l internal volume, with a reaction pressure of 1500 bar and a reaction temperature, adjusted by means of metered-in peroxide, of 220° C. The ethylene throughput was on average 10 kg/h, and the free-radical generator used was a mixture of tert-butyl perpivalate and tert-butyl perisononanoate in a molar ratio of 1:1, dissolved in isododecane. Propionaldehyde was used as molecular weight regulator, added to the gaseous mixture. The peroxide quantities given in the following table are based on the total monomer, in mol ppm.

| Item | $M_n$ [g/mol] | Acrylic acid content [% by wt.] | Propionaldehyde [% by weight] | Peroxide [molar ppm] | MFI [g/10 min] |
|---|---|---|---|---|---|
| B/1 | 70,000 | 21 | 2.0 | 41 | 10.1 |
| B/2 | 59,000 | 30 | 0.4 | 59 | 15.2 |

B/1 comp.: PE/7 acrylic acid $M_n$: 12,000 (determined by GPC), MFI: 330 g/10 min.

B/2 comp.: PE/7 acrylic acid $M_n$: 190,000 (Lucalen® A 3710 from BASF AG), MFI:<0.1 g/10 min.

B/3 comp.: An oxidized low-density polyethylene (LDPE), terminally carboxylated with from about 4 to 5 COOH groups per molecule and a molecular weight $M_n$ (number average) of about 15,000 (Hoechst-Wachs® PED 191 from Hoechst AG). MFI: 150 g/10 min.

The MFI was determined according to DIN 53 735 at 160° C. and 0.325 kg load, and the molecular weight by GPC using HDPE standard.

| | |
|---|---|
| C/1: | TPPO |
| C/2 | Melamine cyanurate with a mean particle size of 1.5 µm. |
| C/3 | Magnesium hydroxide, aminosilanized (Magnifin ® H10B, Martinswerke GmbH). |
| D: | Silanized chopped glass fiber with a thickness of 10 µm. |

Preparation of the thermoplastic molding compositions

Components A) to D), in the mixing ratio seen in the table, were extruded on ZSK 25 at 260° C., 5 kg/h and 120 rpm. The extrudate was cooled in a water bath, and then granulated and dried under reduced pressure for 10 h at 80° C.

The chopped glass fiber was metered into the melt stream.
Comparative example 12 comp. (according to DE-A 42 16 042)

A polyamide prepolymer (Component A*)), prepared by the process described in EP-A 129 195 and having a viscosity number of 58 ml/g was introduced into a twin-screw extruder (ZSK 53 from Werner & Pfleiderer) as melt, using a discharging screw from the precipitation tank of the polycondensation plant, and mixed with component B/3 comp. at 260° C. Degassing was then carried out by applying reduced pressure, virtually no post-condensation taking place. The product was extruded, cooled, granulated and post-condensed using superheated steam at 180° C. and a residence time of 11 h. The viscosity was 150 ml/g after the post-condensation.

For the flammability test, test specimens were injection molded and tested according to UL 94 after the usual conditioning.

The results of the measurements and the formulations of the molding compositions are seen in the Table.

TABLE

| Example | Formulation [% by weight] | | | | Ul 94 [$^1/_{16}$"] | Dripping of burning material |
|---|---|---|---|---|---|---|
| 1 | 75 A/1 | 10 B/1 | 20 C/1 | — | V-0 | no |
| 2 | 78 A/1 | 5 B/2 | 20 C/1 | — | V-0 | no |
| 3 | 50 A/1 | 5 B/1 | 20 C/1 | 25 D | V-0 | no |
| 4comp. | 55 A/1 | — | 20 C/1 | 25 D | V-2 | yes |
| 5comp. | 50 A/1 | 5 B/1comp. | 20 C/1 | 25 D | V-2 | yes |
| 6comp. | 50 A/1 | 5 B/2comp. | 20 C/1 | 25 D | V-2 | yes |
| 7 | 55 A/1 | 5 B/1 | 15 C/2 | 25 D | V-0 | no |
| 8comp. | 55 A/1 | — | 20 C/2 | 25 D | V-2 | yes |
| 9 | 55 A/1 | 5 B/1 | 40 C/3 | — | V-0 | no |
| 10comp. | 55 A/1 | — | 45 C/3 | — | V-2 | yes |
| 11comp. | 98 A/1 | 2 B/3comp. | — | — | V-2 | yes |
| 12comp. | 98 A* | 2 B/3comp. | — | — | V-2 | yes |
| 13 | 50 A/2 | 5 B/1 | 20 C/1 | 25 D | V-0 | no |
| 14comp. | 50 A/2 | — | 25 C/1 | 25 D | V-2 | yes |

We claim:

1. A flame-retardant thermoplastic molding composition comprising
   A) from 10 to 90% by weight of at least one thermoplastic polymer, different from B),
   B) from 1 to 20% by weight of a polyethylene which contains carboxyl groups and has a mean molecular weight $M_n$ (number average) of from 24,000 to 100,000 g/mol,
   C) from 5 to 60% by weight of a halogen-free flame retardant,
   D) from 0 to 70% by weight of other additives and processing aids, where the total of the percentages by weight of components A) to D) is 100%.

2. A thermoplastic molding composition as claimed in claim 1, containing polymers A) selected from the group consisting of the polyesters, polyamides, polycarbonates, polyphenylene ethers, vinylaromatic polymers and mixtures of these.

3. A thermoplastic molding composition as claimed in claim 1, containing, as component B), a copolymer of ethylene and an α, β-unsaturated carboxylic acid of the formula I $$CH_2=\underset{H}{\overset{R}{C}}-\underset{O}{\overset{\|}{C}}-OH \qquad I$$

where R is hydrogen or alkyl having from 1 to 5 carbon atoms.

4. A thermoplastic molding composition as claimed in claim 1, in which component B) has a melt flow index (MFI) of from 1 to 100 g/10 min at 160° C./0.325 kg according to DIN 53 735.

5. A thermoplastic molding composition as claimed in claim 1, in which component B) is built up from from 10 to 50% by weight of compounds which contain carboxyl groups and from 50 to 90% by weight of ethylene.

6. A thermoplastic molding composition as claimed in claim 1, in which component C) is selected from the group consisting of the magnesium hydroxides, phosphorus, phosphorus-containing compounds, melamine, melamine cyanurate, phosphorus-nitrogen compounds or carbonates of alkaline earth metals or mixtures of these.

7. A thermoplastic molding composition as claimed in claim 1, containing, as component D), from 1 to 50% by weight of fibrous fillers.

8. A shaped article prepared from a thermoplastic molding composition as claimed in claim 1.

9. The thermoplastic molding composition of claim 1, wherein C) is selected from the group consisting of phosphorus, phosphorus-containing compounds, melamine, melamine cyanurate and phosphorus-nitrogen compounds.

10. The thermoplastic molding composition of claim 1, wherein the mean molecular weight is from 25,000 to 80,000 g/mol.

11. The thermoplastic molding composition of claim 10, wherein the mean molecular weight is from 50,000 to 70,000 g/mol.

12. The thermoplastic molding composition of claim 4, wherein the melt flow index is from 5 to 50 g/10 min.

13. The thermoplastic molding composition of claim 12, wherein the melt flow index is from 5 to 20 g/10 min.

14. The thermoplastic molding composition of claim 1, wherein polymers A) are selected from the group consisting of polyesters, polyamides, polycarbonates, polyphenylene ethers, vinylaromatic polymers and mixtures of these, and wherein component B) is a copolymer-of ethylene and an α, β-unsaturated carboxylic acid of the formula I $$CH_2=\underset{H}{\overset{R}{C}}-\underset{O}{\overset{\|}{C}}-OH \qquad I$$

where R is hydrogen or alkyl having from 1 to 5 atoms.

15. The thermoplastic molding composition of claim 2, wherein polymer A) is a polyamide or a polyphenylene ether.

16. A thermoplastic molding composition as claimed in claim 1, wherein

A) is selected from the group consisting of polyesters, polyamides, polycarbonates, polyphenylene ethers, vinylaromatic polymers and mixtures of thereof, and
B) is a copolymer of ethylene and an α, β-unsaturated carboxylic acid of the formula I

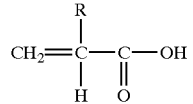

where R is hydrogen or alkyl having from 1 to 5 carbon atoms wherein said copolymer has a melt flow index (MFI) of from 1 to 100 g/10 min at 160° C/325 kg in accordance with DIN 53 753, and comprises from 10 to 50% by weight of compounds which contain carboxyl groups and from 50 to 90% by weight of ethylene.

* * * * *